United States Patent
Leuning

(10) Patent No.: US 7,127,318 B2
(45) Date of Patent: Oct. 24, 2006

(54) METHOD AND DEVICE FOR GUARANTEEING AN AUTHORIZED AND PROCESS-OPTIMIZED USE OF SEMI-FINISHED PIECES IN A PRODUCTION UNIT

(75) Inventor: Hans-Joachim Leuning, Aachen (DE)

(73) Assignee: SIG Combibloc Systems GmbH, Linnich (DE)

( * ) Notice: Subject to any disclaimer, the term of this patent is extended or adjusted under 35 U.S.C. 154(b) by 26 days.

(21) Appl. No.: 10/501,203

(22) PCT Filed: Jan. 9, 2003

(86) PCT No.: PCT/EP03/00117

§ 371 (c)(1),
(2), (4) Date: Feb. 16, 2005

(87) PCT Pub. No.: WO03/060802

PCT Pub. Date: Jul. 24, 2003

(65) Prior Publication Data

US 2005/0131566 A1    Jun. 16, 2005

(30) Foreign Application Priority Data

Jan. 15, 2002  (DE) ................................ 102 01 409

(51) Int. Cl.
*G06F 19/00* (2006.01)
(52) U.S. Cl. ...................................... 700/116
(58) Field of Classification Search .................. 700/90, 700/95, 99, 116, 171
See application file for complete search history.

(56) References Cited

U.S. PATENT DOCUMENTS 3,821,873 A * 7/1974 Benner et al. ................. 53/437

(Continued)

FOREIGN PATENT DOCUMENTS

| DE | 3313578 | 10/1983 |
|----|---------|---------|
| DE | 41 92 274 | 8/1998 |
| DE | 197 41 251 | 3/1999 |
| DE | 199 14 297 | 10/2000 |
| EP | 1 041 006 | 10/2000 |

(Continued)

*Primary Examiner*—Leo Picard
*Assistant Examiner*—Chad Rapp
(74) *Attorney, Agent, or Firm*—The Webb Law Firm

(57) ABSTRACT

A method and device for guaranteeing an authorized and process-optimized use of semi-finished pieces for product generation in a production unit are disclosed. In order to guarantee that semi-finished pieces not released for production or similar cannot be processed unknowingly, said method comprises the following steps: reading calibration data for calibration of the production unit to the semi-finished pieces for processing and reading the data on a given maximum number of products to be produced (maximum number) from an external storage medium supplied with the semi-finished product, calibration of the production unit according to the calibration data for the delivered semi-finished products, programming the production unit to the maximum permitted number of products with the best possible calibration, comparison of a number of produced products since an authorized starting point (actual number) with the maximum number and issuing a message on the maximum number being exceeded by the actual number.

20 Claims, 2 Drawing Sheets

U.S. PATENT DOCUMENTS

| | | | |
|---|---|---|---|
| 3,965,651 A * | 6/1976 | Reichlin | 53/559 |
| 4,208,852 A * | 6/1980 | Pioch | 53/167 |
| 4,514,856 A * | 4/1985 | Asai et al. | 377/8 |
| 5,314,088 A * | 5/1994 | Heuberger et al. | 229/117.3 |
| 5,321,619 A | 6/1994 | Matsuda et al. | |
| 6,516,811 B1 * | 2/2003 | Focke et al. | 131/283 |
| 2003/0158795 A1 * | 8/2003 | Markham et al. | 705/28 |

FOREIGN PATENT DOCUMENTS

| | | |
|---|---|---|
| JP | 02-300784 | 12/1990 |
| JP | 06-162059 | 6/1994 |
| JP | 06-282313 | 10/1994 |
| JP | 09-155546 | 6/1997 |
| JP | 2001-290931 | 10/2001 |
| JP | 2001-318969 | 11/2001 |
| JP | 2003-022962 | 1/2003 |
| WO | WO 00/45324 | 8/2000 |
| WO | WO 01/82009 | 11/2001 |
| WO | WO 02/061511 | 8/2002 |

* cited by examiner

METHOD AND DEVICE FOR GUARANTEEING AN AUTHORIZED AND PROCESS-OPTIMIZED USE OF SEMI-FINISHED PIECES IN A PRODUCTION UNIT

BACKGROUND OF THE INVENTION

1. Field of the Invention

The present invention relates to a method and a device for ensuring authorized and process-optimized use of semi-finished materials or the like for product production in a production facility.

2. Description of the Related Art

Production facilities for the production of products from semi-finished materials are known from practice in greatly varying embodiments.

A method and a device for controlling a (cigarette) manufacturing and packaging facility is known from DE 199 14 297 A1. However, the method described in this case is not one which is suitable for determining and/or ensuring the authorized use of semi-finished materials. Rather, in this case, a method of consumption-optimized assembly of various semi-finished materials into a finished product having a predetermined piece count is described, without an excess or insufficient quantity being produced and/or semi-finished materials being left over. The process parameters of the associated device are also not calibrated to the product variations of the batch of semi-finished materials.

A method of packing objects is known from DE 97 41 251 A1. According to this method, a packing machine is to be operated in such a way that secondary packages are completely filled with objects and excess products may be removed after the end of the production cycle. It is also not possible to determine and/or ensure the authorized use of semi-finished materials using such a device and/or the method claimed in this case. In this case as well, the process parameters of the associated device are not calibrated to the product variations of the semi-finished material batch.

Finally, a device for counting a number of paper sheets, which is equipped with a comfortable preprogramming of a counting device, which stops a stacking drive upon reaching the preprogrammed target number, is known from DE 33 13 578 C2. In this case, it is within the discretion of the machine operator to fix or change the target number or set it to the value "infinite". It is also not possible to determine an authorized use of semi-finished materials with this known device.

It may be problematic in these facilities, among other things, that high-quality and error-free production may only be ensured using semi-finished materials or the like for which the production facilities are laid out and calibrated. Semi-finished materials produced without authorization or low-quality raw materials may be processed, but without the product quality able to be guaranteed.

SUMMARY OF THE INVENTION

It is therefore the object of the present invention that semi-finished materials or the like which are not released for production not being able to be processed unnoticed in a production facility.

In regard to the method, the object is achieved by the following steps:

reading out calibration data to calibrate the production facility to the semi-finished materials to be processed and reading out the data about a predetermined maximum number of products to be produced (maximum number) from an external storage medium supplied with the semi-finished material, calibrating the production facility in accordance with the calibration data of the semi-finished materials supplied, programming the production facility to the maximum enabled number of products using best-possible calibration, comparing a number of products produced from an authorized starting time (actual number) to the maximum number, and outputting a message when the maximum number is exceeded by the actual number.

In this way, it is possible to give the operator of the production facility notice that unreleased semi-finished materials, to which the production facility is not calibrated, were processed from a point in time. The operator is therefore notified of possible production errors and may correspondingly stop or adjust the production process.

The actual number may be established in this case by simple counting of the semi-finished materials processed and/or by counting the process cycles of the machine. The maximum number may be supplied externally. A comparison of these two values is then performed.

A further teaching of the present invention provides that the actual number is established within the production facility and transmitted to a monitoring and control unit. Furthermore, it is advantageous if the maximum number is transmitted to the monitoring and control unit.

In order to avoid manipulations of the data, a further embodiment of the present invention provides that the transmitted date are encrypted. Therefore, alteration of the maximum or actual number may be prevented. As much as possible, the operator is to have no influence on the input of the numeric value of the maximum number.

Furthermore, it may be necessary to check the authenticity of the maximum number or further data. For this purpose, it is advantageous if a transaction number (TAN) is read in for verification with the maximum number and transmitted to the monitoring and control unit. Furthermore, further transmitted data may also be provided with a TAN. The verification via the TAN may be performed either via a computational algorithm or via a list of valid transaction numbers stored in the memory of the monitoring and control unit or via an online connection to a central computer, which is located outside the actual production facility.

Data such as the maximum number, TAN, or even additional or supplementary data of the production process may be stored on a storage medium. This may be an external storage medium. The storage medium may be included with each delivery of semi-finished materials. The data may then be read out of the external storage medium and transmitted to the monitoring and control unit.

Furthermore, each external storage medium may be provided with a check number for verification of the medium and the data stored thereon and with check sums for protection against manipulations. After the use of the data of an external storage medium, control data may either be erased or appropriately changed on the storage medium or the control data of the card may be stored in the device or on an external central computer, so that reuse of the card is prevented.

In order to allow error-free production, a further teaching of the present invention provides that the calibration data for calibration of the production facility is transmitted to the monitoring and control unit. In this way, the production facility may be "automatically" calibrated for the respective semi-finished materials.

In a further embodiment of the present invention, after the maximum number is exceeded by the actual number, the monitoring and control unit stops the production facility and the production only resumes again after reading in a new verified maximum number. In this way, the use of unauthorized semi-finished materials may be prevented.

Packaging materials for producing packages such as beverage packages may be used as semi-finished materials.

A further teaching of the present invention provides that there is a clock generator for determining the actual number of products produced. Using the clock generator, the actual number is determined, which—possibly encrypted—is transmitted to the monitoring and control unit.

Furthermore, a card reading device may be used as the input device for reading in the data stored on the external storage medium. An encryption unit may be provided for encrypting the data and the programs stored in the program memory.

In addition, it may be advantageous if a replaceable external storage medium is used for supplying the relevant data such as the maximum number and further data. The external storage medium may be a card provided with a magnetic strip and/or a memory chip or another magnetic or optical storage medium.

According to another advantageous embodiment of the present invention, the monitoring unit and/or its program may be located completely or partially outside the production system on the external storage medium. In this case, it is only necessary to transmit the actual number to the storage medium for the comparison between the actual number and the maximum number. The data and programs stored on the external memory may not be read out. In this way, it is possible to perform the entire control, regulation, and monitoring process encrypted on a closed unit, which is only used temporarily. In this way, the possibilities for manipulation are greatly limited.

Furthermore, the production facility may be a filling facility for beverage packages.

In the following, the function of an exemplary use of the present invention is described in more detail.

A filling facility for producing beverage packages is provided with a process control unit having an integrated monitoring unit. The process control and monitoring unit controls all essential method steps such as top/bottom sealing, sterilization, metering of the filling product, etc. It is provided with a memory on which all of the programs necessary for controlling the filling facility and all data arising during production are stored. Furthermore, an encryption unit is provided which encrypts the program code and the data to be replaced and/or stored against unauthorized access. Furthermore, the process control and monitoring unit is connected to a reading device, via which the external data may be read in and subsequently transmitted to the control unit.

A "process parameter set" is included with every authorized packaging material delivery. This set is an external storage medium, such as a code card having a magnetic strip and/or a memory chip, on which the maximum number, calibration data, check numbers, and check sums are stored. The maximum number corresponds to the number of semi-finished packaging materials which the delivery includes. The calibration data is, for example, the data about the composite construction of the packaging material, the type of cardboard, or the thickness of the packaging. Through this, it is possible to adapt the filling facility to the specific properties of the respective packaging material.

The data of the code card are read in by the reading device and transmitted to the process control and monitoring unit. The check number stored on the card and the associated check sums are checked for their authenticity and possible prior use. If a manipulation or a prior use is determined in this case, a message is output from the process control and monitoring unit to the operator about the invalidity of the card and he is asked to furnish another code card. If no objections are determined, the actual number is set to zero by the process control and monitoring unit after the maximum number is received, and the production of packages from the semi-finished packaging materials associated with the code card begins.

The process control and monitoring unit is informed of the production of a package, and therefore the processing of a piece of semi-finished material, by a clock generator integrated into the filling facility. The process control and monitoring unit increases the actual number by one. There is then a comparison between the actual number and the maximum number. This state data is stored on the internal memory in encrypted form, so that a process interruption and the resumption of the process on the basis of the stored data is possible at any time.

If the actual number is greater than the maximum number, which is synonymous with the processing of the entire delivery of semi-finished materials, a message is output to the operator of the filling facility, either on a monitor or printer connected to the filling facility, with the information that a new code card must be read in for further error-free production of packages, since otherwise the necessary calibration data for adapting the filling facility to the semi-finished materials is not present and error-free production may not be guaranteed.

The operator then inserts the code card of the next semi-finished material delivery into the reading device and the process control and monitoring unit is supplied a new maximum number after corresponding verification. The process control and monitoring unit may then adjust the filling facility to the new semi-finished materials and continue the filling process.

BRIEF DESCRIPTION OF THE DRAWINGS

The present invention is described in more detail in the following with a drawing, which merely illustrates one exemplary embodiment. In the drawing

DESCRIPTION OF THE PREFERRED EMBODIMENTS

Figure 1:
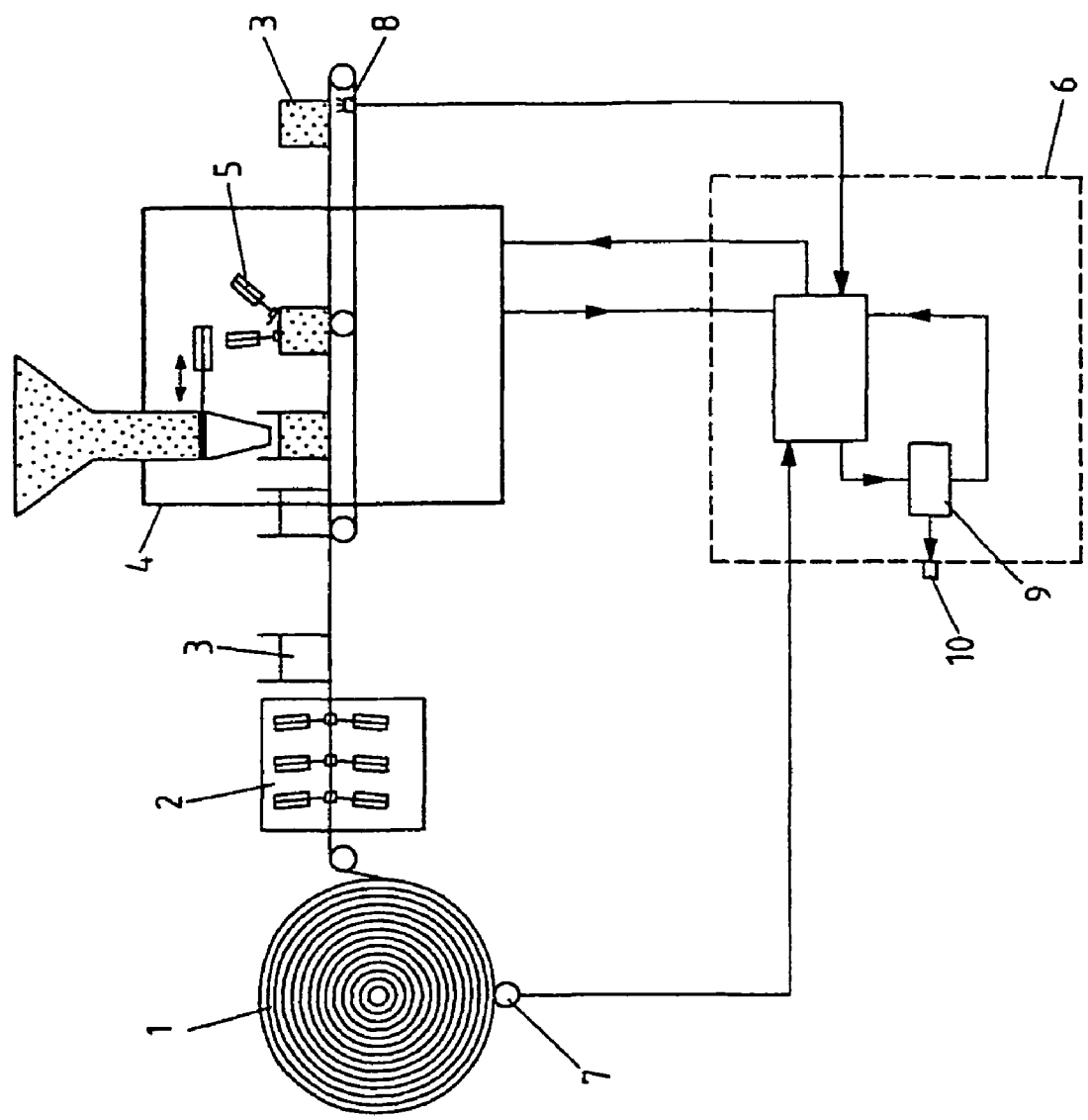
FIG. 1 shows a schematic illustration of a first embodiment of the device according to the present invention and FIG. 2 shows a schematic illustration of a second embodiment of the device according to the present invention.

FIG. 1 schematically illustrates a first preferred exemplary embodiment of the device according to the present invention.

Rolled-up packaging material 1 is supplied to a folding device 2. A packaging sleeve 3, which is sealed in the bottom region and open in the gabled region, is produced in folding device 2 from packaging material 1 and is then transported to a filling machine 4 and filled therein. After completion of the filling process, packaging sleeve 3 is sealed using a sealing device 5, which is located inside filling machine 4. Finished package 3' is supplied for shipment.

A monitoring and control unit 6 is connected to filling machine 4. In addition to the filling process monitoring sensors (not shown), monitoring and control unit 6 communicates with a roll meter detector 7, which monitors the quantity of unrolled packaging material 1, and a product quantity detector 8, which determines the number of packages 3' finished and supplied for shipment.

A product quantity controller 9, comprising a microcontroller (not shown) having a program and operating memory, which is protected and may not be read out, and an encryption unit (also not shown) for encrypting program code and replaced data, is located inside monitoring and control unit 6. The encryption unit is used to ensure that the process controller may not be manipulated through external access. The calculations necessary for the product production are carried out in production quantity controller 9.

Production quantity controller 9 is connected to a data input and output device 10. This may be a magnetic card reading device, a chip card reading device, a keyboard, or a disk drive for replaceable storage media.

Via data input and output device 10, the authenticity of packaging material 1 used is verified and the maximum number of packages 3' to be produced and the calibration data for adapting the process parameters of the filling process to packaging material 1 are supplied to monitoring and control unit 6.

In order to be able to better monitor the maximum number of packages, the metered quantity of uprolled packaging material 1 or piece counts of pre-finished packaging sleeves 1' may be input via data input and output device 10.

This data is compared by monitoring and control unit 6 to the data of roll meter detector 7 and product quantity detector 8. If monitoring and control unit 6 determines that the maximum number of packages 3' to be produced has been exceeded, it outputs a message on a monitor (not shown), which is attached to filling machine 4, for example, or via data input and output device 10, that indicates the maximum permissible product quantity of packages and/or the product quantity of packages possible with the quantity of packaging material delivered has been produced, and that continued production without appropriate recalibration will be performed on the packaging material used, may be defective.

Alternatively, monitoring and control unit 6 may activate an interruption mechanism (not shown), which interrupts the filling process.

In order to erase the message and/or restart the filling process, a renewed, verified maximum-number of products to be produced and calibration data tailored to new packaging material 1 must be supplied to monitoring and control unit 6 via data input and output device 10.

Figure 2:
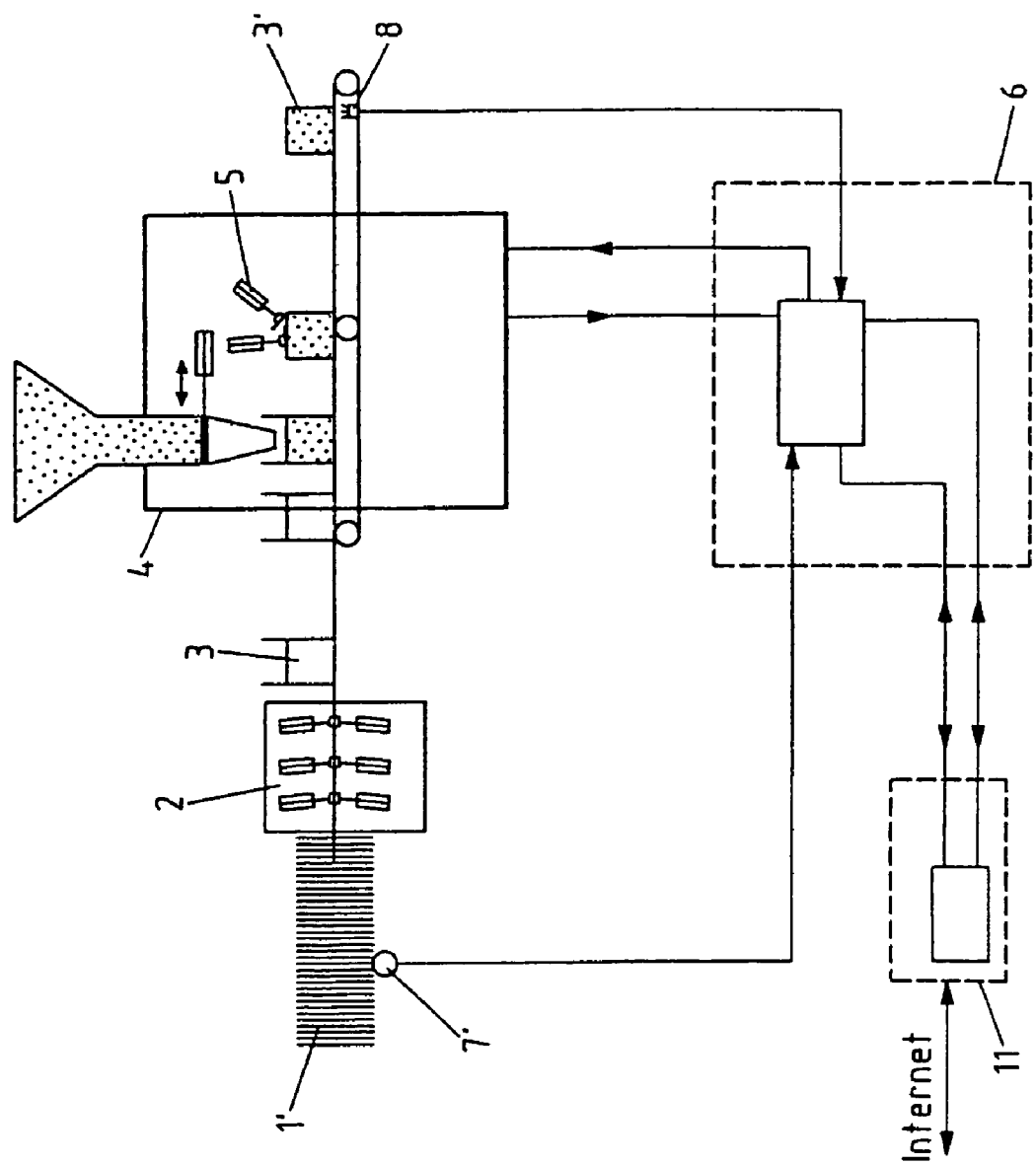

A further preferred exemplary embodiment of the device according to the present invention is schematically illustrated in FIG. 2.

In this case, packaging material 1 is supplied to folding device 2 in the form of packaging sleeves 1'. The subsequent folding and filling process is performed in this case in the same way as in the first exemplary embodiment.

Monitoring and control unit 6 is connected to a packaging sleeve number detector 7' and a product quantity detector 8. The data necessary for verification, process monitoring, and calibration, as well as the maximum number of products to be produced, is supplied to monitoring and control unit 6 from a process computer 11, which is placed at an external location in this exemplary embodiment, via a dedicated line, a data net like the Internet, or via a radio data transmission network or mobile radio network, for example. The monitoring and calibration process is performed in the same way as was already depicted in the first exemplary embodiment.

The invention claimed is:

1. A method of ensuring authorized and process-optimized use of semi-finished materials for product production in a production facility, the method comprising the steps of:
    a) reading out calibration data to calibrate the production facility to the semi-finished materials to be processed and reading out data about a predetermined maximum number of products to be produced, represented as a maximum number, from an external storage medium supplied with the semi-finished material;
    b) calibrating the production facility in accordance with the calibration data of the semi-finished materials supplied;
    c) programming the production facility to the maximum enabled number of products using best-possible calibration;
    d) comparing a number of products produced from an authorized starting time, represented as an actual number, to the maximum number; and
    e) outputting a message when the maximum number is exceeded by the actual number.

2. The method according to claim 1, wherein the actual number determined in the production facility is transmitted to a monitoring and control unit.

3. The method according to claim 2, wherein the maximum number is transmitted to the monitoring and control unit.

4. The method according to claim 3, wherein the actual number and the maximum number are encrypted.

5. The method according to claim 4, wherein a transaction number is read in with the maximum number and transmitted to the monitoring and control unit.

6. The method according to claim 5, wherein the TAN of the products to be produced is read out of the external storage medium delivered with the semi-finished material.

7. The method according to claim 1, wherein the calibration data for calibrating the production facility is transmitted to the monitoring and control unit.

8. The method according to claim 1, wherein the monitoring and control unit stops the production facility and begins the production again after a new verified maximum number is read in after the maximum number is exceeded by the actual number.

9. The method according to claim 1, wherein packaging materials for producing packages are used as the semi-finished materials.

10. A device for ensuring authorized and process-optimized use of semi-finished materials for product production in a production facility, wherein the device is comprised of:
    a monitoring and control unit for comparing an actual number of products produced from an authorized starting time to a maximum number of products to be produced;
    an output device for outputting one of a warning message and a request to input a new maximum number;
    a program memory for storing comparison algorithms; and
    an input device for inputting the maximum number into one of the program memory and the monitoring and control unit.

11. The device according to claim 10, further comprising a clock generator for determining the actual number.

12. The device according to claim 10, further comprising an encryption unit for encrypting and decrypting programs and data.

13. The device according to claim 10, further comprising a replaceable external storage medium for supplying one of the maximum number and further data.

14. The device according to claim 13, wherein the external storage medium is a card having one of a magnetic strip and memory chip.

15. The device according to claim 13, wherein the external storage medium is one of a diskette and a tape.

16. The device according to claim 13, wherein the external storage medium is an optical disk.

17. The device according to claim 10, further comprising a monitoring unit, wherein the monitoring unit and programs of the monitoring unit are located outside the production facility.

18. The device according to claim 17, wherein the monitoring unit is connected to the monitoring and control unit via a data net.

19. The device according to claim 10, wherein a card reading device is used as an input device.

20. The device according to claim 10, wherein the production facility is a filling facility.

* * * * *